United States Patent [19]

Noguchi et al.

[11] Patent Number: 5,432,606
[45] Date of Patent: Jul. 11, 1995

[54] INTERFEROMETER FOR THE MEASUREMENT OF SURFACE PROFILE WHICH INTRODUCES A SPATIAL CARRIER BY TILTING THE REFERENCE MIRROR

[75] Inventors: Masato Noguchi; Masahiro Oono, both of Tokyo, Japan

[73] Assignee: Asahi Kogaku Kogyo Kabushiki Kaisha, Tokyo, Japan

[21] Appl. No.: 180,818

[22] Filed: Jan. 10, 1994

Related U.S. Application Data

[63] Continuation of Ser. No. 836,417, Feb. 18, 1992, abandoned.

[30] Foreign Application Priority Data

Feb. 18, 1991 [JP] Japan .................................. 3-109921
Feb. 18, 1991 [JP] Japan .................................. 3-109922

[51] Int. Cl.⁶ ............................................. G01B 9/02
[52] U.S. Cl. ....................................... 356/360; 356/359
[58] Field of Search ............... 356/359, 353, 357, 360, 356/345

[56] References Cited

U.S. PATENT DOCUMENTS

| | | | |
|---|---|---|---|
| 3,791,739 | 2/1974 | Kawasaki | 356/359 |
| 3,820,902 | 6/1974 | Kawasaki | 356/359 |
| 3,833,807 | 9/1974 | Takeda | 250/234 |
| 4,053,231 | 10/1977 | Fletcher et al. | 356/106 |
| 4,660,978 | 4/1987 | Wu | 356/353 |
| 4,744,659 | 5/1988 | Kitabayashi | 356/353 |
| 4,832,489 | 5/1989 | Wyant et al. | 356/359 |
| 5,106,194 | 4/1992 | Kuchel | 356/359 |
| 5,157,459 | 10/1992 | Oono et al. | 356/359 |
| 5,218,425 | 6/1993 | Oono | 356/359 |
| 5,243,542 | 9/1993 | Noguchi | 364/525 |

FOREIGN PATENT DOCUMENTS 3137211 5/1982 Germany .
4012503 10/1990 Germany .

OTHER PUBLICATIONS

"Digital Wave-front Measuring Interferometry: Some Systematic Error Sources," *Applied Optics,* vol. 22, No. 21, pp. 3421 to 3432.
English Language Translation of the German Office Action of Dec. 28, 1993.
Applied Physics Academy No. 777, p. 29a-ZE-3 and a copy of the English Translation. Sep. 1989.
Formation of Equidistanced Interference Pattern and its Applications, Riken Symposium Abstract 87-14, and a copy of the English Translation. Aug. 1988.
*Applied Optics,* vol. 22, No. 21, Nov. 1, 1983, pp. 3422 and 3424.
"Application of Liquid Crystal Phase Modulator to Phase-shifting Interferometry II", and the English translation.

*Primary Examiner*—Samuel A. Turner
*Attorney, Agent, or Firm*—Sandler, Greenblum & Bernstein

[57] ABSTRACT

This invention relates to a means of analyzing the shape of a surface to be measured by generating interference fringes containing a spatial carrier produced by tilting the wavefronts from a reference surface and the surface to be measured, taking several measurements of these interference fringes while varying the optical path length of the reference surface by means of a phase shift device, applying a spatial fringe scan method to the interference fringe data so as to detect the optical path length variation produced by the phase shift device, applying a temporal fringe scan method to this optical path length variation and several interference fringe data so as to analyze the interference fringes, and then subtracting the spatial carrier from the analytical results.

26 Claims, 5 Drawing Sheets

INTERFEROMETER FOR THE MEASUREMENT OF SURFACE PROFILE WHICH INTRODUCES A SPATIAL CARRIER BY TILTING THE REFERENCE MIRROR

This application is a continuation of application Ser. No. 07/836,417, filed Feb. 18, 1992, now abandoned.

BACKGROUND OF THE INVENTION

1. Field of the Invention

This invention concerns an interferometer which analyzes wavefronts by the fringe scan method, and in particular concerns an interferometer which accurately measures the displacement of a reference mirror.

2. Description of the Prior Art

One method of measuring the shape of an object at wavelengths below the order of the wavelength of light, is the fringe scan method using an interferometer. In the fringe scan method, a light beam from a single source is split into two components, and reflected by a surface to be measured and a reference surface. The two reflected beams are combined so as to generate interference fringes on the image pickup surface of a CCD camera. Either the surface to be measured or the reference surface is displaced in the direction of the optic axis, the variation in the amount of light in each picture element of the camera is analyzed, and the shape of the surface to be measured is then determined.

To displace the surfaces along the optic axis, a piezo device or other phase shift device is used. Since the precision of the measurement is determined by the precision of the displacement, the piezo device must be accurately controlled.

In conventional interference systems, the response of the piezo device was considered as a function of the applied voltage. First, the system was calibrated to determine the relation between the response and the applied voltage, and the displacement of the reference surface was then computed from the applied voltage.

The response of the piezo device however varies not only due to the applied voltage, but also due to external disturbances such as temperature variations and/or vibration. If the displacement of the reference surface is computed based only on the applied voltage as described hereintofore, therefore, the measurement precision decreases.

The following three conventional methods of precisely measuring the response of the piezo device are known.

The first is disclosed in Preview Papers of the Applied Physics Academy No. 777, page 29a-ZE-3, published in Autumn 1989. According to this method, Young's interference patterns are formed on part of the interference surface to apply a shifter correction, and a phase shift is measured in real time by computing the phases of these patterns.

The second is a method disclosed in APPLIED OPTICS Vol. 22, No. 21, According to equations (9) and (10) given on page 3424 of this reference, the response of a piezo device can be measured by an ordinary digital interferometer system.

The third is disclosed in Riken Symposium Abstract 87-14. In "The Generation of Equidistant Interference Fringes and their Application" described in pages 31–34 of this reference, the phase of equidistant linear interference fringes is calculated by applying an inverse tangent of Fourier integration. This can then be used to measure the displacement of a peizo device with a polarizing interferometer, and measure the retardation of a phase shifter.

The above methods are however associated with the following disadvantages.

In the first method, in addition to the parts comprising the interferometer, special parts are required to detect the phase shift of a monitor mirror, etc. The diameter of the optical system is unnecessarily large because it comprises both a monitor and a sampler. Further, since the monitor and sampler are separate, their phase shifts may differ especially if there is a plurality of phase shift devices.

In the second method, it is assumed that the piezo device has a linear response, and a precise measurement cannot therefore be made if the response is non-linear. In general, piezo devices possess some non-linearity.

Ill the third method, as can be understood from equations (2), (3), (4) (which are expressed below in the specification) which form the principle of the measurement, the spatial frequency of the fringes must be accurately set. If the number of interference fringes slightly differs from this setting, the precision of the measurement decreases markedly. Further, special devices such as a birefringence prism must be used which makes the apparatus complex.

SUMMARY OF THE INVENTION

This invention aims to provide an interferometer wherein no special parts other than the basic construction of the interferometer are required, and wherein the response of the piezo device can be measured with high precision.

In the interferometer of this invention, the wavefronts from a reference surface and a surface to be measured are tilted and are superimposed, and interference fringes containing a spatial carrier due to the tilt are measured a plurality of times. The response of the piezo or other phase shift device is detected by applying the spatial fringe scan method to the measured results. The interference fringes may be measured at a plurality of points, and the spatial fringe scan method applied to each measurement. Subsequently, a wavefront containing the spatial carrier is analyzed by a temporal fringe scan method based on the response and the measured interference fringes. The shape of the measured surface is then determined by subtracting the spatial carrier due to the tilt from the analyzed wavefront data.

DETAILED DESCRIPTION OF THE EMBODIMENTS

The embodiments of the present invention will now be described hereinafter with reference to the drawings. The present disclosure relates to subject matter contained in Japanese patent application Nos. H3-109921

(filed on Feb. 18, 1991) H3-109922 (filed on Feb. 18, 1991) which are expressly incorporated herein by reference in their entireties.

EMBODIMENT 1

Figure 1:
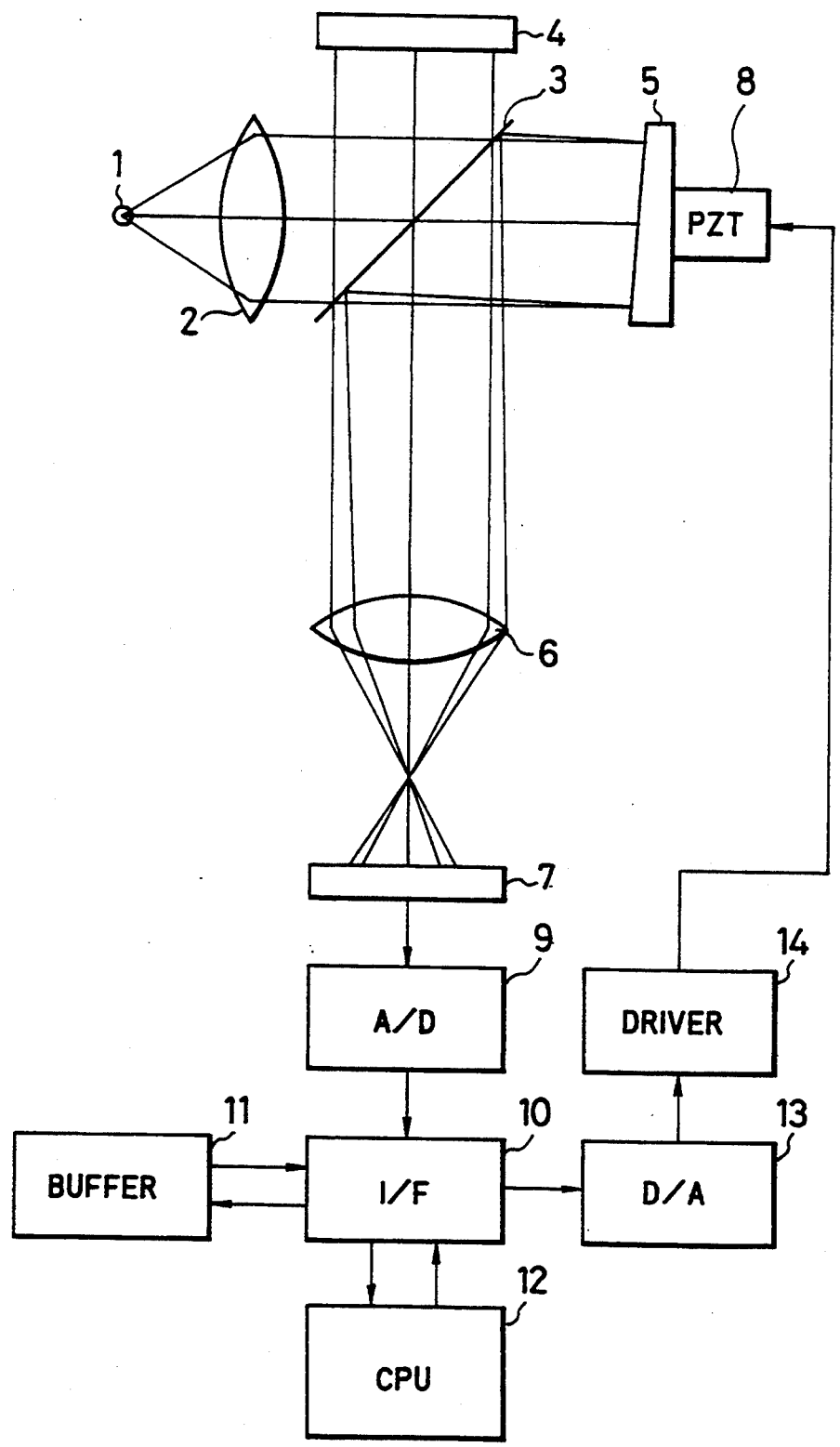
FIG. 1 is a schematic view of Embodiment 1 of the interferometer of this invention.
Figure 2:
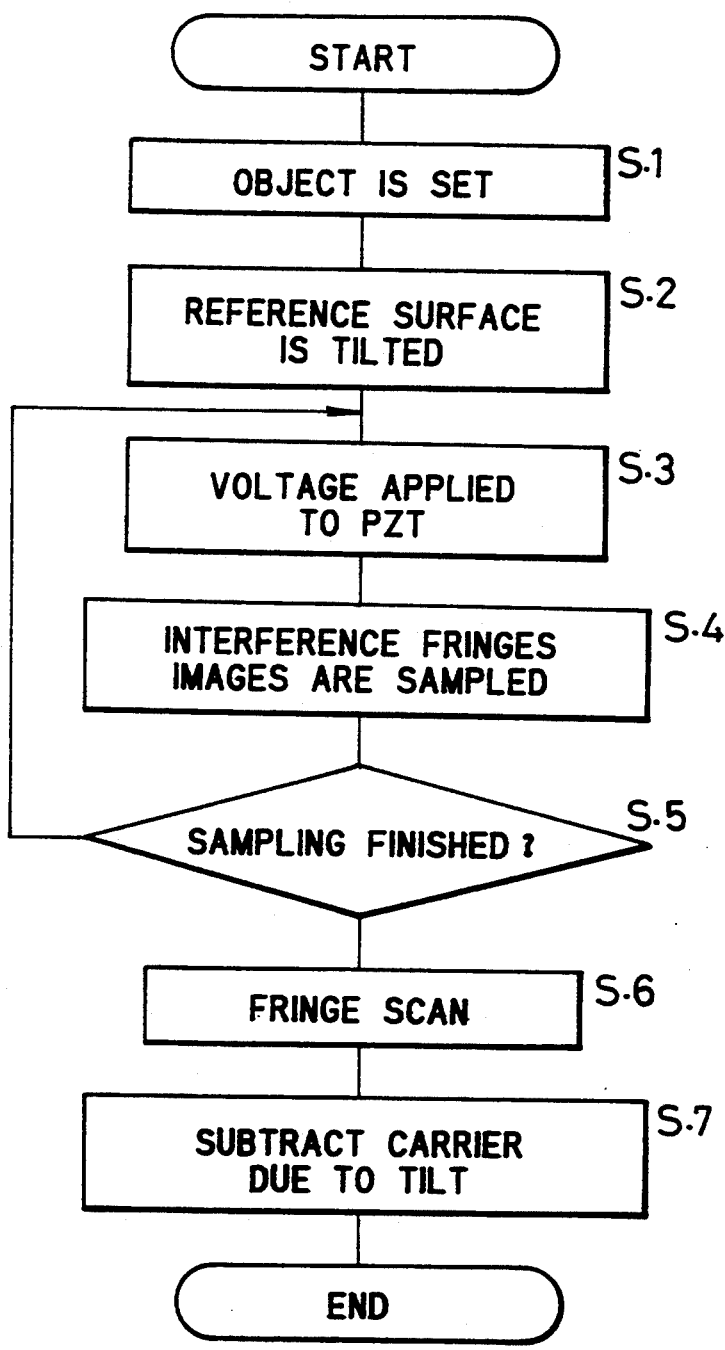
FIG. 2 is a flowchart showing the action of the interferometer of Embodiment 1.

FIGS. 1 and 2 illustrate Embodiment 1 of the interferometer of this invention.

In the optical system of FIG. 1, a divergent beam emitted by an optical source 1 is made parallel by a collimator lens 2, and is split by a half mirror 3 into beams directed at a plane mirror 4 and a reference mirror 5. The light beams reflected by these mirrors are superimposed by the half mirror 3, and form an image via an imaging lens 6 on the image pickup surface of a CCD camera 7 situated in a pupil plane conjugate to the pupil.

The reference mirror 5 is previously disposed at a tilt with respect to the optic axis, and is supported such that it is free to move in the direction of the optic axis by a piezo device 8 which acts as a phase shift device. Fine interference fringes containing a spatial carrier produced by the tilt are thereby formed on the image pickup surface of the CCD camera 7.

The reference mirror 5 is supported free to tilt such that its angle can be adjusted. A wedge-shaped prism may also be inserted in the optical path between the half mirror 3 and the reference mirror 5 instead of tilting the reference mirror 5. The analog image output of the CCD camera 7 is converted to digital data by an A/D converter 9, and is stored by an image buffer 11 via an interface 10. A CPU 12 reads and processes image data, and controls the piezo device 8 via a D/A converter 13 and a driver 14.

The image processing functions of the CPU 12 comprise a displacement detection function, a first analysis function and a second analysis function. The displacement detection function reads image data one frame at a time, and applies the spatial fringe scan method to detect the displacement of the reference mirror 5 by the piezo device 8 when the image data has been entered. The first analysis function takes a plurality of combinations of displacements and image data, and applies a temporal fringe scan method to analyze interference fringes containing a spatial carrier. The second analysis function subtracts the spatial carrier produced by the tilt from the analyzed interference fringes so as to analyze the shape of the surface to be measured.

The principle of the spatial fringe scan method used in the measurement of this invention will now be described.

In general, the intensity distribution of interference fringes $I(x,y)$ may be represented by the following equation (1):

$$I(x,y) = a(x,y) + b(x,y)\cos[\phi(x,y)] \quad (1)$$

where $\phi(x,y)$ is the phase with respect to the reference plane of the surface to be measured, and $a(x,y)$, $b(x,y)$ is a spatial intensity distribution produced by unevenness in the light flux or the ununiformity of reflectance distribution at the mirror surface of the interferometer. Hereinafter, to simplify the description, it will be assumed that the intensity distribution is first order in the x direction. The intensity distribution $I(x)$ of the interference fringes may be expressed by the following equation (2):

$$I(x) = a(x) + b(x)\cos[\phi(x)] \quad (2)$$

When the reference mirror 5 is tilted, the intensity distribution $I(x)$ of the interference fringes is given by the following equation (3), wherein the spatial frequency of the tilt component produced by the tilt of the mirror is $v$:

$$I(x) = a(x) + b(x)\cos[\phi(x) + 2\pi v x] \quad (3)$$

It is seen that the larger $v$ is set, the shorter the period of the interference fringes. By setting $v$ sufficiently large, the variation of $a(x)$, $b(x)$ becomes so small in comparison to the phase term $\cos[\phi(x,y)]$ within one period of interference fringes that it is negligible, and these unwanted terms can then be considered as constants. The intensity distribution of the interference fringes within a predetermined field may then be expressed by equation (4):

$$I(x) = a + b \cdot \cos[\phi + 2\pi v x] \quad (4)$$

Let the period of fine interference fringes containing the spatial carrier produced by the tilt be $T = 1/v$. Dividing a given period into N equivalent parts, the fringe intensity is integrated over the field. To simplify the calculation, assume $N = 4$. We then obtain equation (5):

$$Ij = aT/4 + (b/\sqrt{2})\cos[\phi(x) + (\pi/2)j] \quad (5)$$

Writing the intensity at four points as I1, I2, I3, I4, from equation (6), we can then determine the phase $\phi$ of the wavefront of the part in which we are interested:

$$\phi = \arctan[(I3 - I1)/(I2 - I0)] \quad (6)$$

By performing this measurement at points in the pupil having different coordinates and preferably over the whole wavefront, we can obtain information about the whole measured surface.

In the spatial fringe scan method, as measurements can be performed without driving the movable mirror, the wavefront can be measured by a simple construction.

To measure the intensity at four points within one period of the interference fringes as described hereintofore, it is preferable to generate $\frac{1}{4}$n interference fringes for n picture elements of the CCD camera in order to minimize the measurement error. The surface to be measured or the reference surface is therefore tilted so as to obtain a suitable number of interference fringes for measurement. In this embodiment, the number of picture elements of the CCD camera is 256, and the number of interference fringes is 64.

The action of the interferometer of Embodiment 1 will now be explained based in FIG. 2.

In S.1, the plane mirror 4 which is an object to be measured is set so as to align the interferometer, and in step S.2, the reference mirror 5 is tilted so as to produce fine interference fringes on the CCD camera 7.

In step S.3, the voltage applied to the piezo device 8 is varied so as to displace the reference mirror 5 in the direction of the optic axis, and in a step S.4, the interference fringe images are sampled. The spatial fringe scan method is applied to the sampled interference fringe patterns, and the accurate displacement of the reference mirror 5 is found.

In step S.5 it is determined whether or not a predetermined number of image data have been sampled. Steps S.3 and S.4 are repeated until the predetermined number is reached. The phase of the wavefront containing the spatial carrier due to the tilt is determined by the temporal fringe scan method based on this image data and the displaced position of the reference mirror 5 during sampling. In step S.7, the shape of the plane mirror 4 is then determined by subtracting the carrier due to the tilt.

The displaced position of the reference mirror 5 during image sampling can be accurately found as described hereintofore even if the actual displacement differs from the intended displacement due to vibration or the like, and the analysis can therefore be corrected accordingly. The correction method is described in e.g. APPLIED OPTICS, Vol. 22, page 3422, equation (7) in the right-hand column.

EMBODIMENT 2

Figure 3:
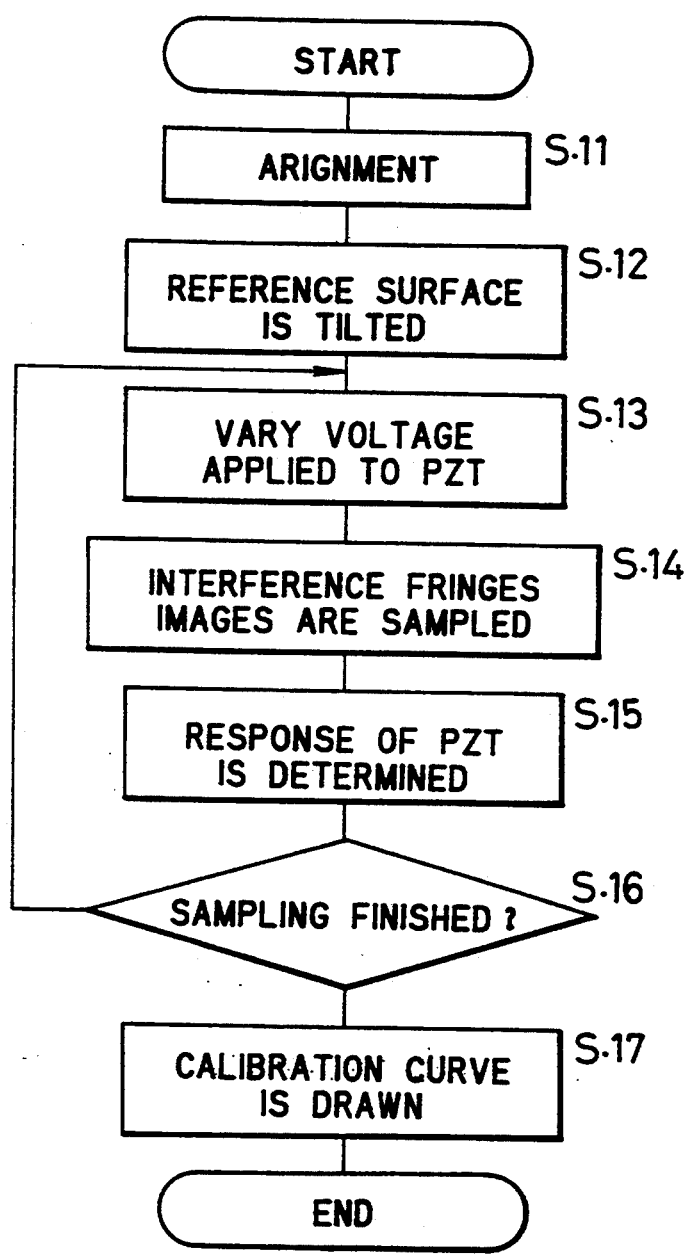
FIG. 3 is a flowchart showing the action of the interferometer of Embodiment 2.

FIG. 3 is a flowchart showing the action of the interferometer in a second embodiment of this invention.

In Embodiment 2, the CPU 12 analyzes interference fringes at a plurality of points within one period by means of the spatial fringe scan method. This analysis is performed at points having different coordinates in the wavefront, the measured wavefront is averaged over the pupil, and the averaged results are taken as the displacement of the movable mirror. The measurement is repeated while varying the voltage applied to the piezo device 8, the relation between the applied voltage and the displacement of the piezo device 8 is found, and a calibration curve is drawn.

The precision of the measurement is greater the larger the number of measured points in the measurement pupil. The measurement precision of the spatial fringe scan method is of the order of $\lambda/30$, but if the measurement is performed for each of the $100 \times 100$ picture elements and the average is taken, the precision is then $\lambda/3000$.

In step S.11 in FIG. 3, the plane mirror 4 is set to align the interferometer, and in step S.12, the reference mirror 5 is tilted so as to generate fine interference fringes in the CCD camera 7.

In step S.13, the voltage applied to the piezo device 8 is varied, the reference mirror 5 is displaced in the direction of the optic axis, and in step S.14 the interference fringe images are sampled. In step S.15, the spatial fringe scan method is applied to the sampled interference fringes images, and the displacement of the reference mirror 5, i.e. the response of the piezo device 8, is determined.

In step S.18, it is determined whether or not a predetermined number of image data have been sampled, Steps S.13, S.14 and S.15 are repeated until the predetermined number has been reached. After completing measurements within the range of applied voltage used and sampling the predetermined number of image data, a calibration curve is deduced and drawn step S.17 based on the mirror displacement and the applied voltage.

To determine the shape of the object to be measured, a voltage corresponding to the desired displacement is applied to the piezo device 8 based on the calibration curve, and the shape is analyzed based on the displacement and the sampled wavefront.

Figure 4:
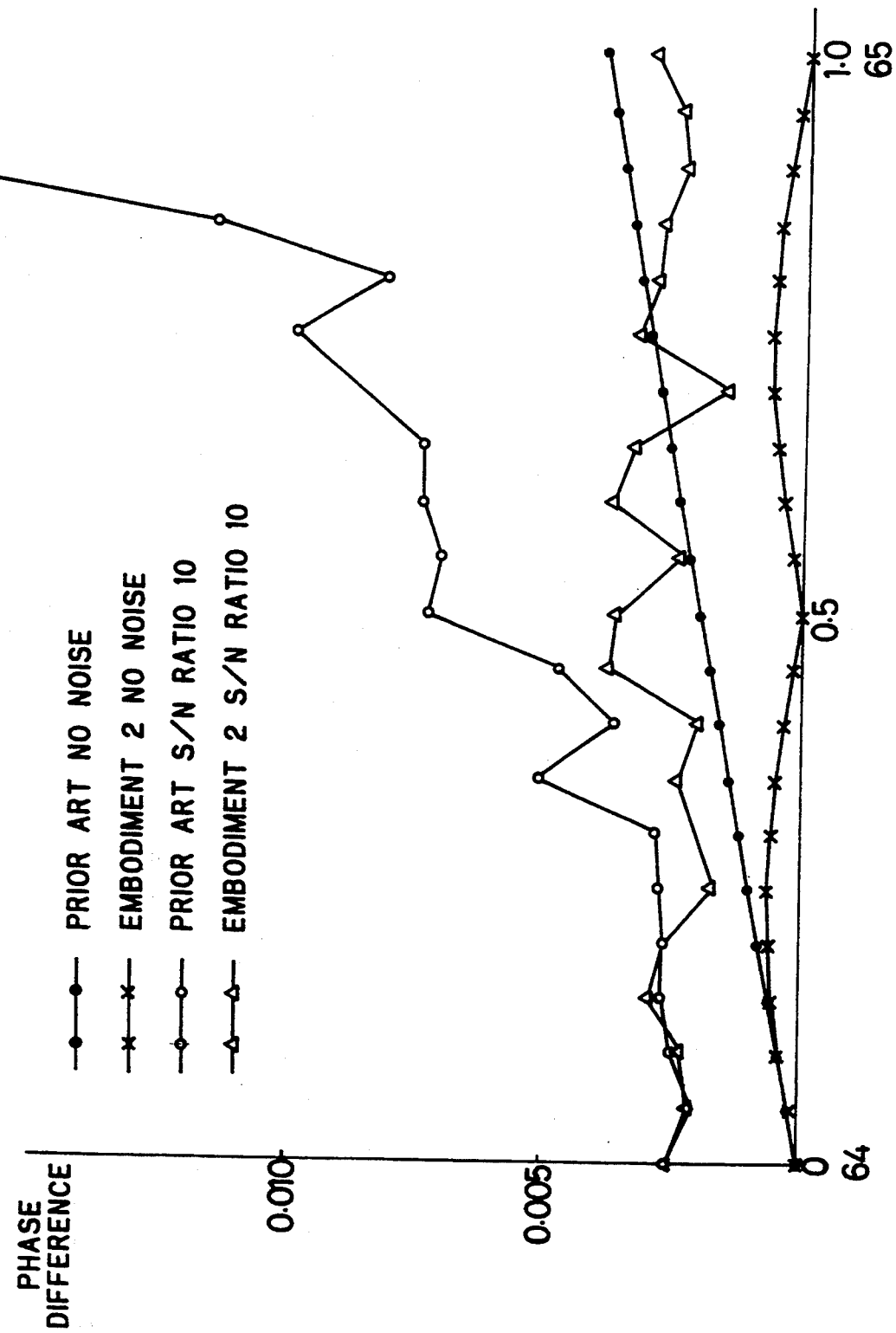
FIG. 4 is a graph showing the measurement error relation between the method of this invention and the conventional method.

FIG. 4 is a graph showing the phase difference between the case wherein the piezo device 8 is driven based on the calibration curve found by the method of Embodiment 2, and the case where the piezo device 8 is driven by the method disclosed in the aforesaid Prior Art; Riken symposium Abstract 87-14. The error on the vertical axis is shown when the interval between the interference fringes is 1. The lines X—X and $\Delta$—$\Delta$ show the errors in the method of Embodiment 2, the former line applying to the case where there is no noise and the latter to the case where S/N ratio is 10. The lines — and ○—○ show similar results for the method disclosed in the aforesaid reference.

If there are 64 interference fringes as originally set, the reading phase error is the same by any method. If there is no noise it is 0, while if there is noise corresponding to an S/N ratio of 10, it is of the order of 0.0025.

If the number of interference fringes is different from the original setting, when there is no noise according to the method of the Riken's reference, the error increases progressively as a first order function, and reaches approx. 0.004 when there are 65 interference fringes. According to the method of Embodiment 2, the error can be suppressed to less than 0.001.

When there is noise corresponding to an S/N ratio of 10, according to the method of Riken's reference the error increases considerably. According to the method of Embodiment 2, it can be suppressed to less than 0.004.

The angular variation of the reference mirror 5 while the piezo device 8 is being driven can be interpreted as a variation of the tilt component (first order component) of the interference fringes. If the object to be measured is of large diameter, the diameter of the reference mirror increases and a plurality of piezo devices may be used to drive it. In such a case, the displacement of each piezo device may be calculated separately from the average and from the tilt, and the scatter in the response of the piezo devices can also be corrected.

Figure 5:
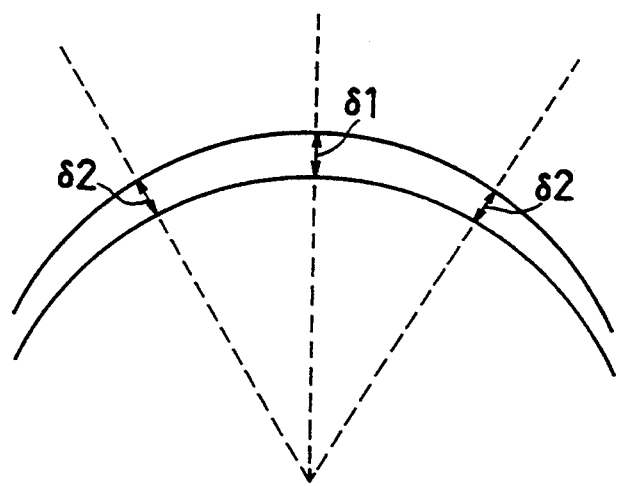
FIG. 5 is a schematic view of the case where a spherical surface is measured.

If the reference mirror is spherical, a difference as shown in FIG. 5 appears between the displacement $\delta 1$ of the central part and the displacement $\delta 2$ of the peripheral part when the mirror is displaced in the direction of the optic axis. This difference can be calculated by measuring the defocusing component (second order component) in the intensity distribution of the interference fringes.

In addition to wavefront analysis by the fringe scan method, piezo devices are also applied to precision byte control.

Further, in addition to the piezo device used to cause a displacement, any device which causes a variation of optical path length, e.g. by introducing a change of refractive index into the optical path, may also be used.

What is claimed is:

1. A method for measuring a shape of a surface with an interferometer comprising the steps of:
   (a) positioning a reference surface relative to a surface to be measured and superimposing wavefronts reflected from said reference surface and said surface to be measured, wherein said reference surface and said surface to be measured are tilted relative to one another so that interference fringes produced by said superimposing contain a spatial carrier;
   (b) measuring said interference fringes at a plurality of times while shifting at least one of said surfaces with a phase shift device;
   (c) detecting a response of said phase shift device based on a wavelength of light used to form said interference fringes and an amount of movement of said measured interference fringes;

(d) analyzing said superimposed wavefronts and said interference fringes containing a spatial carrier produced therefrom, by a temporal fringe scan method based on said response and said measured interference fringes; and (e) subtracting said spatial carrier from the analyzed wavefront data in order to analyze the shape of said surface to be measured.

2. A method for measuring a shape of a surface according to claim 1, wherein said reference surface is mounted so as to enable adjustment of an angle of said reference surface.

3. A method for measuring a shape of a surface according to claim 1, wherein said reference surface is capable of moving in the direction of the optic axis upon varying a voltage applied to a piezo device.

4. A method for measuring a shape of a surface with an interferometer as defined in claim 1, wherein said measuring said interference fringes at a plurality of times comprises shifting said at least one of said surfaces with a phase shift device with respect to the other of said surfaces without altering the degree of tilt between said surfaces.

5. A method for measuring a shape of a surface with an interferometer as defined in claim 1, wherein said measuring said interference fringes at a plurality of times comprises shifting said at least one of said surfaces along an optical axis of the interferometer.

6. A method for detecting an amount of movement of a surface to be measured comprising the steps of:

(a) tilting a reference surface relative to a surface to be measured and superimposing wavefronts reflected from said reference surface and said surface to be measured, wherein said reference surface and said surface to be measured are tilted relative to one another so that interference fringes produced by said superimposing contain a spatial carrier;

(b) measuring said interference fringes at a plurality of times while shifting at least one of said surfaces with respect to the other of said surfaces without altering the degree of tilt between said surfaces; and (c) detecting an amount of movement of said at least one of said surfaces based on a wavelength of light used to form said interference fringes and an amount of movement of said measured interference fringes.

7. A method for detecting an amount of movement as defined in claim 6, wherein the amount of movement detected is a function of phase differences between said wavefronts, with components of said phase differences comprising an average.

8. A method for detecting an amount of movement as defined in claim 6, wherein the amount of movement detected is a function of phase differences between said wavefronts, with components of said phase differences comprising an average and a tilt.

9. A method for detecting an amount of movement of a surface to be measured as defined in claim 6, wherein said measuring said interference fringes at a plurality of times comprises shifting said at least one of said surfaces along an optical axis of the interferometer.

10. A method for detecting an amount of movement of a surface to be measured comprising the steps of:

(a) tilting a reference surface relative to a surface to be measured and superimposing wavefronts reflected from said reference surface and said surface to be measured, wherein said reference surface and said surface to be measured are tilted relative to one another so that interference fringes produced by said superimposing contain a spatial carrier;

(b) measuring said interference fringes at a plurality of times while shifting at least one of said surfaces; and (c) detecting an amount of movement of said at least one of said surfaces based on a wavelength of light used to form said interference fringes and an amount of movement of said measured interference fringes, wherein the amount of movement detected is a function of phase differences between said wavefronts, with components of said phase differences comprising an average and a focus error.

11. A method for deriving a calibration curve of a phase shift device comprising the steps of:

(a) superimposing wavefronts reflected from a reference surface and a surface to be driven by said phase shift device, said reference surface and said surface to be driven being tilted with respect to one another so that interference fringes produced by said superimposition contain a spatial carrier;

(b) measuring said interference fringes at a plurality of times while shifting said surface to be driven by varying an applied voltage to said phase shift device;

(c) detecting a displacement resultant from said shifting of said surface, based on a wavelength of light used to form said interference fringes and an amount of movement of said measured interference fringes; and (d) deriving a calibration curve based on said displacement and said applied voltage.

12. A method for deriving a calibration curve according to claim 11, wherein said phase shift device comprises a piezo device.

13. An apparatus for detecting an amount of movement of a surface to be measured comprising:

means for tilting a reference surface relative to a surface to be measured;

means for superimposing wavefronts reflected from said reference surface and said surface to be measured, wherein said reference surface and said surface to be measured are tilted relative to one another so that interference fringes produced by said superimposing contain a spatial carrier;

means for measuring said interference fringes a plurality of times while shifting at least one of said surfaces; and means for detecting an amount of movement of said at least one of said surfaces based on a wavelength of light forming said interference fringes and an amount of movement of said measured interference fringes;

wherein said detecting means detects an amount of movement of said at least one of said surfaces by applying a spatial fringe scan method to said measurements of interference fringes; and wherein the amount of movement detected by said detecting means applying a spatial fringe scan method is a function of phase differences between said wavefronts, with components of said phase differences comprising an average and a tilt.

14. An apparatus for detecting an amount of movement of a surface to be measured comprising:

means for tilting a reference surface relative to a surface to be measured;

means for superimposing wavefronts reflected from said reference surface and said surface to be measured, wherein said reference surface and said surface to be measured are tilted relative to one another so that interference fringes produced by said superimposing contain a spatial carrier;

means for measuring said interference fringes a plurality of times while shifting at least one of said surfaces; and means for detecting an amount of movement of said at least one of said surfaces based on a wavelength of light forming said interference fringes and an amount of movement of said measured interference fringes;

wherein said detecting means detects an amount of movement of said at least one of said surfaces by applying a spatial fringe scan method to said measurements of interference fringes; and wherein the amount of movement detected by said detecting means applying a spatial fringe scan method is a function of phase differences between said wavefronts, with components of said phase differences comprising an average and a focus error.

15. An apparatus for detecting an amount of movement of a surface to be measured comprising:

means for tilting a reference surface relative to a surface to be measured;

means for superimposing wavefronts reflected from said reference surface and said surface to be measured, wherein said reference surface and said surface to be measured are tilted relative to one another so that interference fringes produced by said superimposing contain a spatial carrier;

means for measuring said interference fringes a plurality of times while shifting at least one of said surfaces; and means for detecting an amount of movement of said at least one of said surfaces based on a wavelength of light forming said interference fringes and an amount of movement of said measured interference fringes;

wherein the amount of movement detected by said detecting means applying a spatial fringe scan method is a function of phase differences between said wavefronts, with components of said phase differences comprising an average.

16. An apparatus for detecting an amount of movement of a surface to be measured comprising:

means for tilting a reference surface relative to a surface to be measured;

means for superimposing wavefronts reflected from said reference surface and said surface to be measured, wherein said reference surface and said surface to be measured are tilted relative to one another so that interference fringes produced by said superimposing contain a spatial carrier;

means for measuring said interference fringes a plurality of times while shifting at least one of said surfaces; and means for detecting an amount of movement of said at least one of said surfaces based on a wavelength of light forming said interference fringes and an amount of movement of said measured interference fringes;

wherein the amount of movement detected by said detecting means applying a spatial fringe scan method is a function of phase differences between said wavefronts, with components of said phase differences comprising an average and a tilt.

17. An apparatus for detecting an amount of movement of a surface to be measured comprising:

means for tilting a reference surface relative to a surface to be measured;

means for superimposing wavefronts reflected from said reference surface and said surface to be measured, wherein said reference surface and said surface to be measured are tilted relative to one another so that interference fringes produced by said superimposing contain a spatial carrier;

means for measuring said interference fringes a plurality of times while shifting at least one of said surfaces; and means for detecting an amount of movement of said at least one of said surfaces based on a wavelength of light forming said interference fringes and an amount of movement of said measured interference fringes;

wherein the amount of movement detected by said detecting means applying a spatial fringe scan method is a function of phase differences between said wavefronts, with components of said phase differences comprising an average and a focus error.

18. An apparatus for deriving a calibration curve of a phase shift device comprising:

a phase shift device for driving a surface;

means for superimposing wavefronts reflected from a reference surface and said surface which is driven by said phase shift device, said reference surface and said surface which is driven being tilted with respect to one another so that interference fringes produced by said superimposition contain a spatial carrier;

means for measuring said interference fringes at a plurality of times while shifting said surface which is driven by varying an applied voltage to said phase shift device;

means for detecting a displacement resultant from said shifting of said surface, based on a wavelength of light forming said interference fringes and an amount of movement of said measured interference fringes; and means for deriving a calibration curve based on said displacement and said applied voltage.

19. An apparatus according to claim 18, wherein said phase shift device comprises a piezo device.

20. An apparatus according to claim 18, further comprising means for pivotally mounting said reference surface, wherein said reference surface is tilted with respect to said surface to be measured.

21. An apparatus for measuring a shape of a surface comprising:

an optical system for superimposing wavefronts reflected from a reference surface and a surface to be measured, wherein interference fringes produced by said superimposing contain a spatial carrier;

a phase shift device for varying at least one of an optical path length of said reference surface, and an optical path length of said surface to be measured;

means for measuring said interference fringes a plurality of times while varying at least one of said optical path lengths with said phase shift device;

means for detecting a response due to said varying, based on a spatial fringe scan method;

means for analyzing said superimposed wavefronts and said interference fringes containing a spatial carrier produced therefrom, by a temporal fringe scan method based on said detected response and said measured interference fringes; and means for subtracting said spatial carrier from the analyzed wavefront in order to measure the shape of said surface to be measured.

22. An apparatus for measuring a shape of a surface according to claim 21, further comprising a wedge-shaped prism for tilting the optical path of at least one of said reference surface and said surface to be measured, so as to produce said spatial carrier upon said superimposing.

23. An apparatus for measuring a shape of a surface as defined in claim 21, wherein said phase shift device varies said at least one of said optical path lengths by shifting said at least one of said surfaces along an optical axis of the apparatus.

24. An apparatus for measuring a shape of a surface comprising:

an optical system for superimposing wavefronts reflected from a reference surface and a surface to be measured, wherein interference fringes produced by said superimposing contain a spatial carrier;

a phase shift device for varying at least one of an optical path length of said reference surface, and an optical path length of said surface to be measured;

means for measuring said interference fringes a plurality of times while varying at least one of said optical path lengths with said phase shift device;

means for detecting a response due to said varying, based on an amount of movement of said interference fringes and a wavelength of light used to form said interference fringes;

means for analyzing said superimposed wavefronts and said interference fringes containing a spatial carrier produced therefrom, by a temporal fringe scan method based on said detected response and said measured interference fringes; and means for subtracting said spatial carrier from the analyzed wavefront in order to measure the shape of said surface to be measured.

25. An apparatus for measuring a shape of a surface according to claim 24, further comprising a wedge-shaped prism for tilting the optical path of at least one of said reference surface and said surface to be measured, so as to produce said spatial carrier upon said superimposing.

26. An apparatus for measuring a shape of a surface as defined in claim 24, wherein said phase shift device varies said at least one of said optical path lengths by shifting said at least one of said surfaces along an optical axis of the apparatus.

* * * * *